United States Patent [19]

Chang

[11] Patent Number: 5,036,674
[45] Date of Patent: Aug. 6, 1991

[54] ACCUMULATOR MOUNTING METHOD AND APPARATUS

[75] Inventor: Dick Y. K. Chang, Indianapolis, Ind.

[73] Assignee: Carrier Corporation, Syracuse, N.Y.

[21] Appl. No.: 560,257

[22] Filed: Jul. 27, 1990

Related U.S. Application Data

[63] Continuation of Ser. No. 432,816, Nov. 7, 1989, abandoned.

[51] Int. Cl.$^5$ .............................................. F25D 23/00
[52] U.S. Cl. ................................................. 62/77; 62/298; 403/195; 403/365; 411/61; 411/182; 411/510; 411/907
[58] Field of Search ................ 62/298, 503, 77; 403/195, 243, 365; 411/60, 61, 182, 437, 508–510, 907, 908, 913

[56] References Cited

U.S. PATENT DOCUMENTS

| | | | |
|---|---|---|---|
| 2,596,952 | 5/1952 | Crowther | 411/61 |
| 3,315,558 | 4/1967 | Fischer | 411/913 X |
| 3,433,119 | 3/1969 | Ballantyne | 411/437 |
| 3,754,409 | 8/1973 | Wreen et al. | 62/503 |
| 3,910,156 | 10/1975 | Soltysik | 411/61 |
| 3,938,353 | 2/1976 | Wreen et al. | 62/503 |
| 4,203,193 | 5/1980 | Arthur | 411/61 X |
| 4,376,254 | 4/1983 | Hellmann | 403/365 X |
| 4,430,033 | 2/1984 | McKewan | 411/61 |
| 4,768,355 | 9/1988 | Breuhan et al. | 62/503 |
| 4,800,737 | 1/1989 | Smith et al. | 62/503 |
| 4,952,106 | 8/1990 | Kubozochi et al. | 411/60 X |

FOREIGN PATENT DOCUMENTS

| | | | |
|---|---|---|---|
| 659637 | 5/1938 | Fed. Rep. of Germany | 403/243 |
| 2701833 | 7/1978 | Fed. Rep. of Germany | 411/510 |
| 323 | of 1902 | United Kingdom | 403/243 |

*Primary Examiner*—William E. Tapolcai

[57] ABSTRACT

The mounting stud of an accumulator is secured within a central opening of a base pan mounted elastomeric grommet by way of a metal sleeve having outwardly extending protuberances that grip the inner walls of the elastomeric grommet and inwardly extending protuberances that grip the threaded stud. The protuberances are angled in such a way that both the stud and the sleeve are easily inserted into their mating component but subsequent removal is substantially prevented.

4 Claims, 1 Drawing Sheet

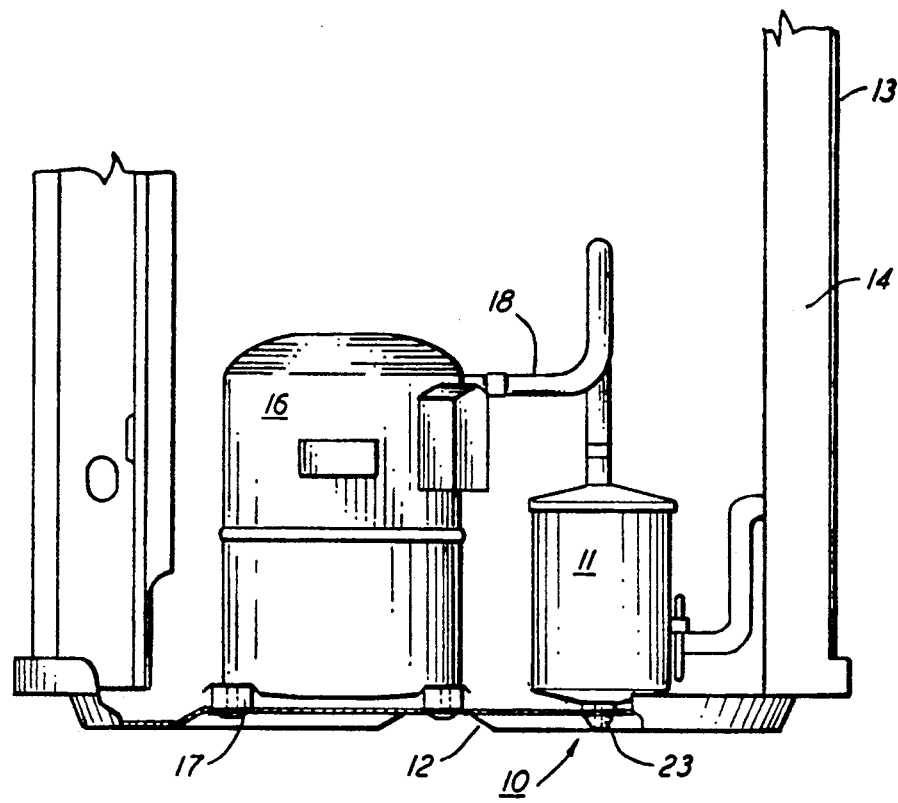
FIG. 1
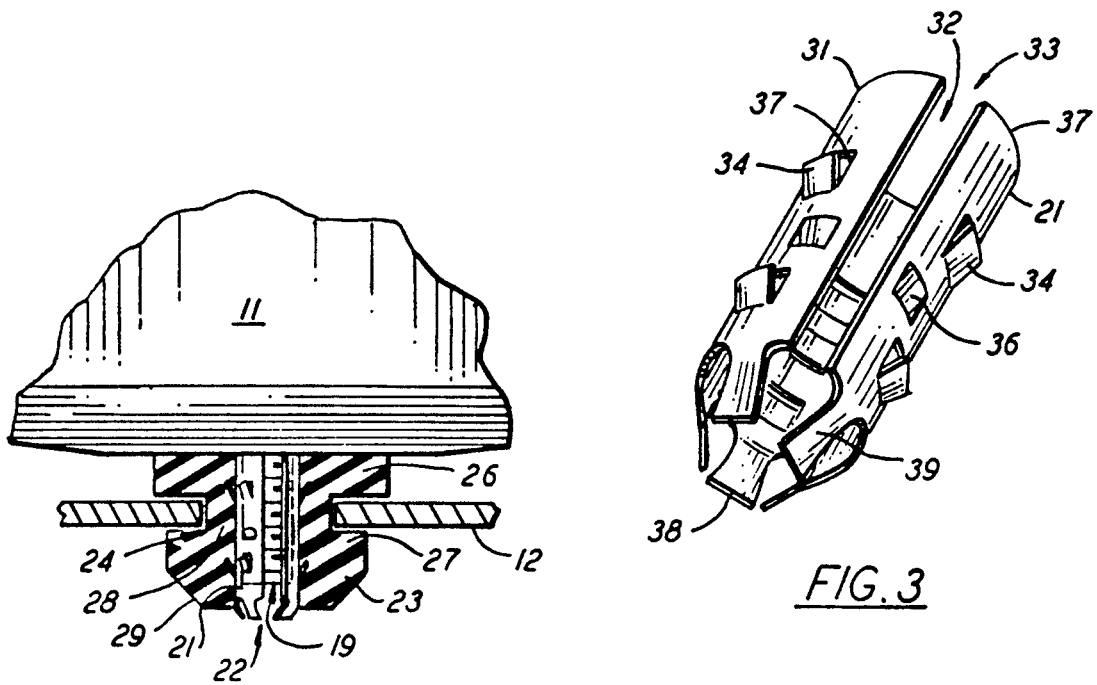
FIG. 2
FIG. 3

ACCUMULATOR MOUNTING METHOD AND APPARATUS

This application is a continuation of application Ser. No. 432,816 filed Nov. 7, 1989, abandoned.

BACKGROUND OF THE INVENTION

This invention relates generally to air conditioning systems and, more particularly, to a method and apparatus for mounting an accumulator to a base structure of an air conditioning system.

One of the components of an air conditioning system (i.e., either a packaged unit or a split system) is an accumulator which functions as a storage space for a portion of the refrigerant upstream of the compressor in the refrigerant circuit. In addition to the refrigerant piping connections, the accumulator is usually mounted to the base structure of the unit by way of a threaded stud extending downwardly from the accumulator. A common approach for fastening the unit to the base is to pass the stud through an opening in the base and then to attach a fastener from the underside of the base pan. This is not only a difficult assembly operation because of the limited accessibility, but it also allows the fastener to work loose during unit operation and to thereby result in vibrational noise.

Another approach is to secure a cup-shaped bracket to the accumulator stud by way of a threaded nut and to then spot-weld or to otherwise secure the bracket to the base pan. Again, the assembly process is complicated by the need to secure the bracket to the base plate in a relatively complex manner. Further, the problem of the fastener working loose is exacerbated by the inability to reach the fastener for purposes of tightening it.

An improved method of attachment devised by the applicants involved the use of an elastomeric grommet which was temporarily deformed to pass its tapered end through an opening in the base plate, after which it was allowed to return to its original form to engage the surrounding portion of the base plate in an annular groove of the grommet to thereby secure it in place. The stud of the accumulator was then inserted into the central opening of the grommet to thereby secure the accumulator to the basepan. This not only provided a simple and effective method of installing and retaining the accumulator in the base plate, but it also provided for a damping of any vibration between the accumulator and the base plate. The problem recognized by the applicant, however, was that occasionally, the threaded stud would pull out of the elastomeric grommet (e.g. during times when the equipment was in transit), so that the accumulator was no longer secured in place.

It is therefore an object of the present invention to provide an improved method and apparatus for attaching an accumulator to the base pan of an air conditioning system.

Another object of the present invention is the provision in an accumulator mounting apparatus for preventing the accumulator from being accidentally disconnected from the base structure of an air conditioning system.

Yet another object of the present invention is the provision for simply and reliably securing an accumulator to the base structure thereof.

Still another object of the present invention is the provision in an air conditioning unit for an accumulator mounting apparatus which is economical to manufacture, simple to install and reliable in use. These objects and other features and advantages become more readily apparent upon reference to the following description when taken in conjunction with the appended drawings.

SUMMARY OF THE INVENTION

Briefly, in accordance with one aspect of the invention, a sleeve is interposed between the stud of the accumulator and the surrounding elastomeric grommet. The sleeve has protuberances provided on its inner surface to frictionally engage the threads of the stud so as to prevent the stud from being pulled out the sleeve. The sleeve also has protuberances on the outer side thereof which frictionally engage the inner wall of the grommet to thereby prevent the sleeve from being pulled out of the grommet. The sleeve is simply pushed on to the stud and the combination is then inserted into the grommet, with the grommet having been inserted into the opening of the base pan of the air conditioning unit. In this way, the accumulator is simply installed from the top down and then the assembly is reliably held in place by the protuberances on the sleeve.

By another aspect of the invention, the protuberances are angled appropriately to facilitate the easy insertion of both the stud into the sleeve and of the sleeve into the grommet. The inner protuberances or barbs are angled radially inwardly as they extend in a direction away from the accumulator as its stud is being installed into the sleeve, and the outer barbs are angled radially outwardly as they extend in a direction toward the accumulator. The angled barbs thus provide for ease of installation and enhanced retaining ability.

By yet another aspect of the invention, the one end of the sleeve, away from the accumulator, is beveled so as to facilitate easy installation into the grommet. In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 1 is a partial cross-sectional view of an outdoor unit with the present invention incorporated therein.

FIG. 2 is a partial cross-sectional view of the accumulator mounting portion thereof.

FIG. 3 is a perspective view of the sleeve portion of the present invention.

DESCRIPTION OF THE PREFERRED EMBODIMENT

Referring now to FIG. 1, the invention is shown generally at 10 as applied to an accumulator 11 which is attached to the base pan 12 of an outdoor unit 13. The unit 13 also includes a heat exchanger coil 14 and a compressor 16, both of which operate in a conventional manner in carrying out the refrigeration cycle. The compressor 16 is preferably mounted to the base pan 12 by way of elastomeric mounts 17 such that vibrations and noise generated by the compressor 16 are dampened, so as to prevent their being transmitted to other areas within the system. The accumulator 11 is fluidly connected to the compressor 16 by way of a refrigerant line 18 which carries refrigerant vapor to the suction port of the compressor 16 in a conventional manner.

Referring now to FIG. 2, the details of the manner in which the accumulator 11 is rigidly attached to the base pan 12 of the unit are shown. At the lower end of the accumulator 11, there is integrally attached a depending, threaded stud 19 for securing the accumulator 11 to the base pan 12. Closely surrounding the stud 19 in a manner to be explained hereinafter, is a sleeve 21, with the sleeve 21 in turn being frictionally disposed within the central cavity 22 of an elastomeric grommet 23.

The elastomeric grommet 23 is disposed within an opening 24 of the base pan 12 with a top portion 26 being disposed above the base plate 12, a bottom portion 27 being disposed below the base pan 12, and a central portion 28 being disposed within the opening 24. The top portion 26 and the bottom portion 27 jointly define a gap 25 therebetween for receiving the base pan 12 therein. The grommet bottom portion 27 has a tapered end portion 29 to facilitate easy installation of the grommet 23 into the opening 24 by deforming the bottom portion 27 of the grommet as it is inserted into the opening 24 from the top down.

The sleeve 21 is more clearly shown in FIG. 3 to include a tubular portion 31 with a discontinuity 32 which allows the tubular portion 31 to flex, in a springlike manner, to an expanded condition when the stud 19 is inserted into the inner cavity 33 of the sleeve 21. The sleeve 21 is preferably made of a suitable metal material which provides the desired strength, forming, and flexibility characteristics that will serve the intended function of the invention. A metal which has been found to be suitable for this purpose is spring steel.

The sleeve tubular portion 31 has a plurality of outwardly extending protuberances 34 and inwardly extending protuberances 36 as shown. These can be formed, for example, by cutting a three-sided opening 37 in the tubular portion 31 to form a tab which is then bent outwardly or inwardly from the plane of the tubular portion 31 for purposes of gripping the inner walls of the grommet 23 in the case of the outwardly extending protuberances 34, and for gripping the threads of the stud 19 in the case of the inwardly extending protuberances 36. It will be seen that in the case of the outwardly extending protuberances 34, the opening 37 is cut nearest the end 37 into which the stud 19 is inserted such that when the tab is bent outwardly, it extends toward the component (i.e., the accumulator that is attached to the stud.) In this way, it tends to act as a barb for preventing the grommet from coming off after it has been installed over the sleeve from its other end 38. Similarly, the openings for the inwardly extending protuberances 36 are cut nearest the end 38 such that when the tab is bent inwardly, it is angled away from component (i.e., the accumulator) such that when the stud is inserted into the end 37 of the sleeve, it can easily slide over the inwardly extending protuberances but is prevented from being subsequently withdrawn therefrom.

In order to facilitate the easy installation of the sleeve 21 into the grommet 23, the one sleeve end 38 has a plurality of unconnected projections 39 that are bent radially inwardly in a tapered fashion such that the end 38 can be easily inserted into the grommet central opening 22 and then gradually cause the sleeve 21 to be flexed radially inwardly to facilitate the further insertion of the sleeve therein.

The process of installation is then accomplished as follows. The grommet 23 is first inserted into the base pan opening 24 as described above. The sleeve 21 is then installed over the accumulator stud 19 with the inwardly extending protuberances 36 acting to engage the stud threads so as to retain the sleeve thereon. The stud and sleeve combination is then inserted into the opening 22 of the grommet 23, with the outwardly extending protuberances 34 acting to engage the grommet inner walls to as to prevent the withdrawal of the sleeve therefrom.

While the present invention has been disclosed with particular reference to a preferred embodiment, the concepts of this invention are readily adaptable to other embodiments, and those skilled in the art may vary the structure thereof without departing from the essential spirit of the present invention.

What is claimed is:

1. A method of securing into a base structure of an air conditioning system, a component of the type having a stud that is fastened into an opening in the base structure by way of an elastomeric grommet, comprising the steps of;
   providing a cylindrically shaped sleeve member, said sleeve member having outwardly and inwardly extending protuberances and having an integral extension on one end of said sleeve, said extension having an open end and being tapered to gradually increase from a minimum diameter at its open end to a maximum diameter equal to that of said cylindrically shaped sleeve to facilitate the insertion into a grommet;
   inserting the component stud into said sleeve such that said inwardly extending protuberances frictionally engage the stud to axially retain the stud within said sleeve; and
   inserting the stud and sleeve combination, integral extension end first, into the grommet such that said outwardly extending protuberances frictionally engage the grommet to axially retain said sleeve within the grommet.

2. A method as set forth in claim 1 and including an initial step of installing the grommet in the base structure opening.

3. A method as set forth in claim 1 wherein said sleeve member is of a metal material.

4. A method as set forth in claim 1 wherein said outwardly and inwardly extending protuberances are angled so as to facilitate easy insertion, but prevent the easy withdrawal of the inserted component stud.

* * * * *